(12) United States Patent
Yun et al.

(10) Patent No.: US 12,260,865 B2
(45) Date of Patent: Mar. 25, 2025

(54) AUTOMATIC INTERPRETATION SERVER AND METHOD BASED ON ZERO UI FOR CONNECTING TERMINAL DEVICES ONLY WITHIN A SPEECH-RECEIVING DISTANCE

(71) Applicant: ELECTRONICS AND TELECOMMUNICATIONS RESEARCH INSTITUTE, Daejeon (KR)

(72) Inventors: Seung Yun, Daejeon (KR); Sang Hun Kim, Daejeon (KR); Min Kyu Lee, Daejeon (KR); Joon Gyu Maeng, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 270 days.

(21) Appl. No.: 17/868,747

(22) Filed: Jul. 19, 2022

(65) Prior Publication Data
US 2023/0038407 A1 Feb. 9, 2023

(30) Foreign Application Priority Data

Aug. 9, 2021 (KR) .................. 10-2021-0104874
Apr. 12, 2022 (KR) .................. 10-2022-0045016

(51) Int. Cl.
| | | |
|---|---|---|
| G10L 17/22 | (2013.01) | |
| G06F 3/16 | (2006.01) | |
| G06F 40/58 | (2020.01) | |
| G10L 17/04 | (2013.01) | |
| G10L 17/06 | (2013.01) | |
| G10L 21/04 | (2013.01) | |

(52) U.S. Cl.
CPC .............. *G10L 17/22* (2013.01); *G06F 3/167* (2013.01); *G10L 17/04* (2013.01); *G10L 17/06* (2013.01)

(58) Field of Classification Search
USPC ........................................... 704/200
See application file for complete search history.

(56) References Cited

U.S. PATENT DOCUMENTS

| | | |
|---|---|---|
| 2021/0049997 A1 | 2/2021 | Yun et al. |
| 2021/0165971 A1 | 6/2021 | Lee et al. |
| 2023/0186036 A1* | 6/2023 | Choi ............ G10L 21/04 704/200 |

FOREIGN PATENT DOCUMENTS

| | | | |
|---|---|---|---|
| CN | 108710615 B | * 3/2020 | ............ G06F 40/58 |
| KR | 20160131855 A | 11/2016 | |

(Continued)

*Primary Examiner* — Farzad Kazeminezhad
(74) *Attorney, Agent, or Firm* — Rabin & Berdo, P.C.

(57) ABSTRACT

Provided a method performed by an automatic interpretation server based on a zero user interface (UI), which communicates with a plurality of terminal devices having a microphone function, a speaker function, a communication function, and a wearable function. The method includes connecting terminal devices disposed within a designated automatic interpretation zone, receiving a voice signal of a first user from a first terminal device among the terminal devices within the automatic interpretation zone, matching a plurality of users placed within a speech-receivable distance of the first terminal device, and performing automatic interpretation on the voice signal and transmitting results of the automatic interpretation to a second terminal device of at least one second user corresponding to a result of the matching.

12 Claims, 6 Drawing Sheets

(56) References Cited

FOREIGN PATENT DOCUMENTS

| KR | 101747874 B1 | 6/2017 |
|---|---|---|
| KR | 20190119521 A | 10/2019 |
| KR | 102056329 B1 | 12/2019 |
| KR | 102069237 B1 | 1/2020 |
| KR | 1020210124050 A | 10/2021 |

\* cited by examiner

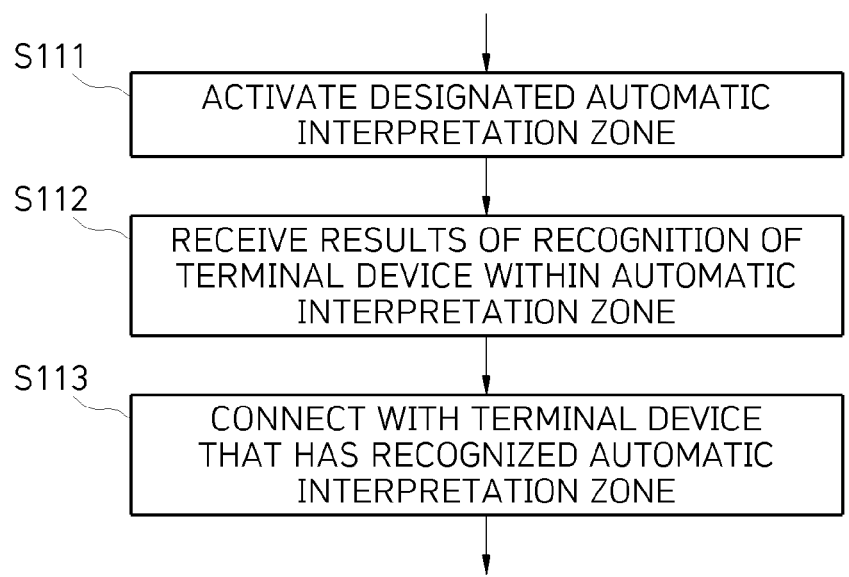

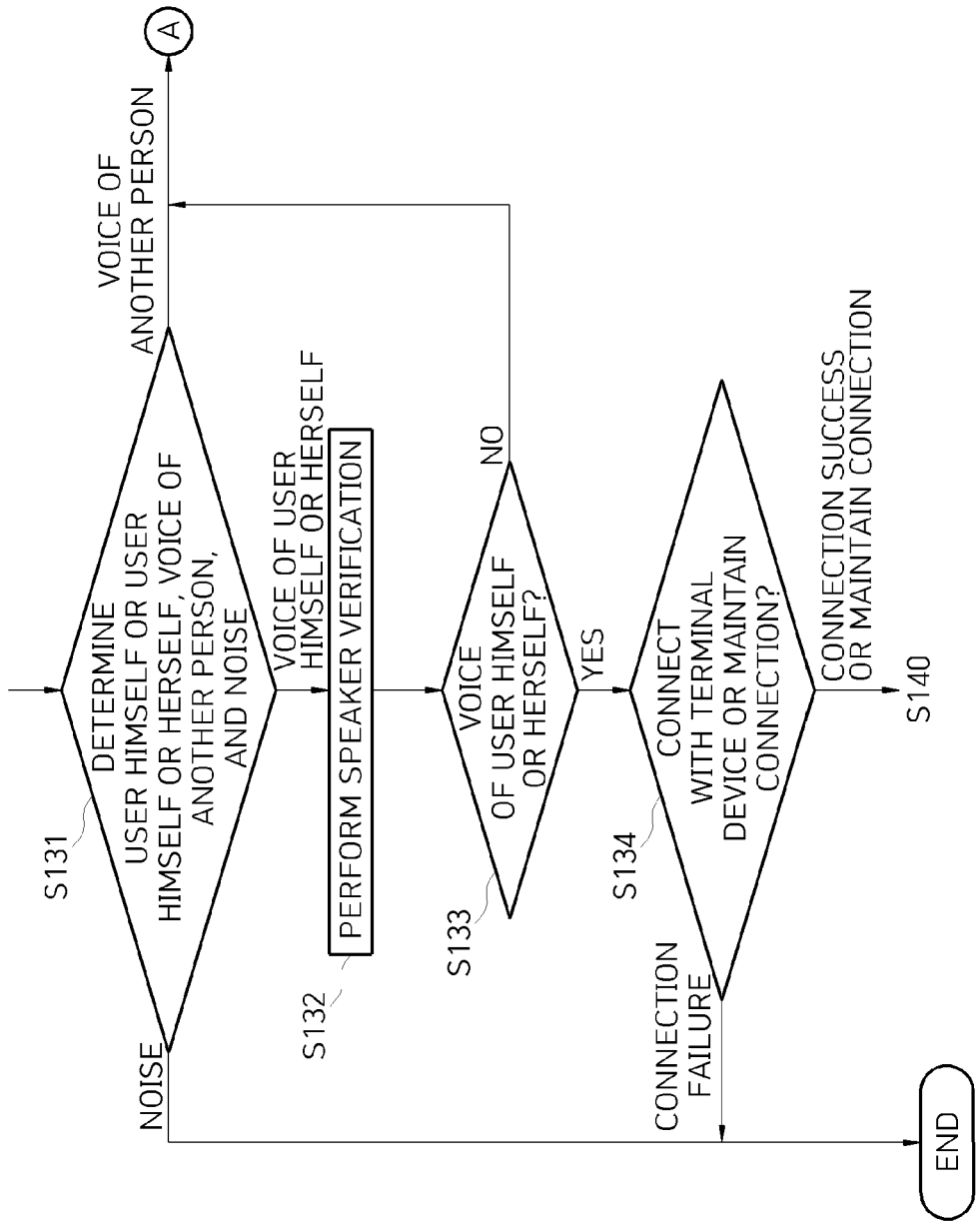

AUTOMATIC INTERPRETATION SERVER AND METHOD BASED ON ZERO UI FOR CONNECTING TERMINAL DEVICES ONLY WITHIN A SPEECH-RECEIVING DISTANCE

CROSS-REFERENCE TO RELATED APPLICATION

This application claims priority to and the benefit of Korean Patent Application No. 10-2021-0104874, filed on Aug. 9, 2021, and Korean Patent Application No. 10-2022-0045016, filed on Apr. 12, 2022, the disclosure of which is incorporated herein by reference in its entirety.

BACKGROUND

1. Technical Field

The present disclosure relates to an automatic interpretation server and method based on a zero user interface (UI) and, particularly, to a technology about an automatic interpretation server and method based on a zero UI, which do not require a UI such as a display screen.

2. Related Art

With the development of the voice recognition, automatic translation, and voice synthesis technologies, the automatic interpretation technology is widely spread. In general, the automatic interpretation technology is performed by a smartphone or a dedicated terminal for automatic interpretation.

After touching a screen provided in a smartphone or a dedicated terminal or clicking on a button provided therein, a user brings the smartphone or the dedicated terminal near the mouth and then speaks a sentence to be interpreted.

Thereafter, the smartphone or the dedicated terminal generates a translation from the spoken sentence of the user through voice recognition, automatic translation, etc., and provides the results of the interpretation to a counterpart in a way to output the translation to a screen or output an interpreted voice corresponding to the translation through voice synthesis.

As described above, the common automatic interpretation process performed by the smartphone or the dedicated terminal requires a touch operation or a click operation for the smartphone or the dedicated terminal whenever a sentence to be interpreted is spoken.

Furthermore, in this case, in the state what language does the counterpart uses is unclear, a case where which language should be translated is unclear occurs.

Such factors make a user very inconvenient and are factors that hinder a natural conversation.

SUMMARY

Various embodiments are directed to providing an automatic interpretation server and method, which enable users who are placed in an automatic interpretation zone to naturally talk each other without an unnecessary operation of a user, which is performed whenever the user speaks a sentence to be interpreted, by automatically matching and connecting the users.

Various embodiments are directed to providing an automatic interpretation server and method, which can solve a problem in that an automatic interpretation terminal device of a user and/or an automatic interpretation terminal device of a counterpart malfunction in a situation in which a voice of the user is input to the automatic interpretation terminal device of the counterpart or a voice of the counterpart is input to the automatic interpretation terminal device of the user and can solve a problem that an automatic interpretation terminal device malfunctions because a voice of a third party not an interpretation counterpart is input to the automatic interpretation terminal device.

However, an object to be solved by the present disclosure is not limited to the aforementioned object, and other objects may be present.

In an embodiment, a method performed by an automatic interpretation server based on a zero user interface (UI), which communicates with a plurality of terminal devices having a microphone function, a speaker function, a communication function, and a wearable function includes connecting terminal devices disposed within a designated automatic interpretation zone, receiving a voice signal of a first user from a first terminal device among the terminal devices within the automatic interpretation zone, matching a plurality of users placed within a speech-receivable distance of the first terminal device, and performing automatic interpretation on the voice signal and transmitting results of the automatic interpretation to a second terminal device of at least one second user corresponding to a result of the matching.

In an embodiment, an automatic interpretation server based on a zero user interface (UI) includes a communication module connected to a plurality of terminal devices disposed within a designated automatic interpretation zone and configured to communicate with the plurality of terminal devices, a memory which registers and stores voice signals and speaker information including use languages of users from the plurality of terminal devices and in which a program for providing an automatic interpretation function has been stored, and a processor configured to, when receiving a voice signal of a terminal device within the automatic interpretation zone as the program stored in the memory is executed, match a plurality of users within a speech-receivable distance of the terminal device based on the voice signal and speaker information, perform automatic interpretation on the voice signal, and transmit results of the automatic interpretation to a terminal device corresponding to a result of the matching through the communication module.

In an embodiment, a computer program is combined with a computer, that is, hardware, executes the automatic interpretation method based on a zero UI, and is stored in a computer-readable recording medium.

Other details of the present disclosure are included in the detailed description and the drawings.

According to an embodiment of the present disclosure, the automatic interpretation terminal device does not requires a user interface, such as a screen or a button for performing automatic interpretation, because the automatic interpretation terminal device is implemented in the form of a wearable device. Accordingly, a natural conversation between a user and a counterpart is possible because automatic interpretation is processed without an unnecessary operation of the user touching a screen or clicking on a button in a terminal.

Furthermore, an unnecessary connection step between users can be omitted because automatic connections between a server and a terminal device and between terminal devices are supported in an automatic interpretation zone.

Furthermore, a malfunction attributable to redundant automatic interpretation, which is performed in a terminal device of a counterpart because a spoken voice of a user is input to the terminal device of the counterpart, can be prevented through a personal voice activity detection process and a speaker verification and identification process for an actually spoken user.

Through such effects, the present disclosure enables a natural automatic interpretation conversation based on a zero UI in an untact situation.

The effects of the present disclosure are not limited to the above-mentioned effects, and other effects which are not mentioned herein will be clearly understood by those skilled in the art from the following descriptions.

BRIEF DESCRIPTION OF THE DRAWINGS

FIG. 5 is a diagram for describing a process of connecting terminal devices in an automatic interpretation zone.

FIGS. 6A and 6B are flowchart for describing a process of matching users in an embodiment of the present disclosure.

DETAILED DESCRIPTION

Figure 1:
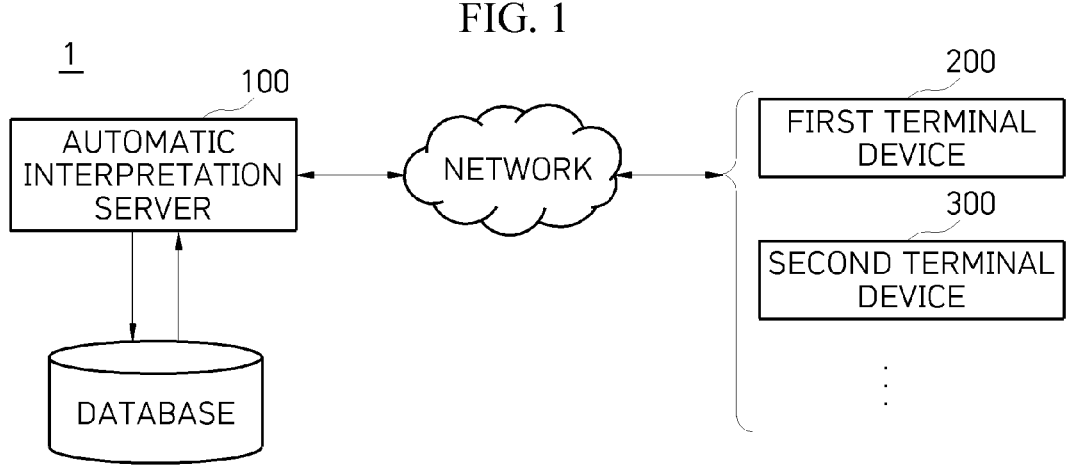
FIG. 1 is a general configuration diagram of an automatic interpretation system based on a zero UI according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various elements, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Figure 2:
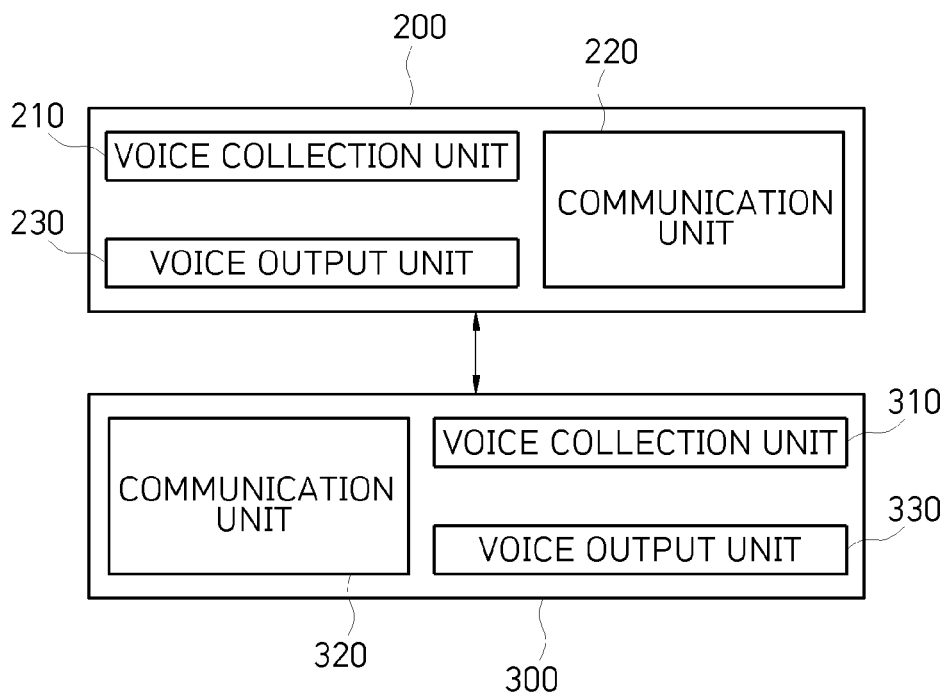
FIG. 2 is a block diagram of a terminal device according to an embodiment of the present disclosure.
Figure 3:
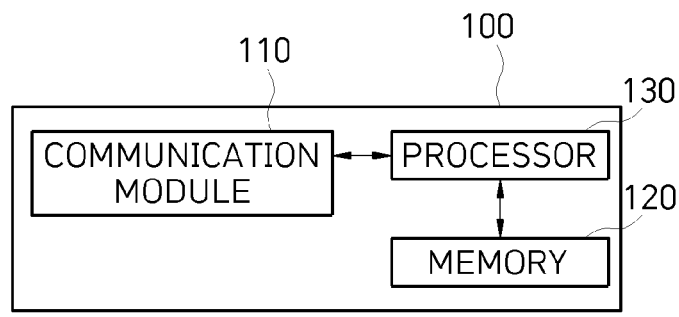
FIG. 3 is a block diagram of an automatic interpretation server according to an embodiment of the present disclosure.

FIG. 1 is a general configuration diagram of an automatic interpretation system 1 based on a zero UI according to an embodiment of the present disclosure. FIG. 2 is a block diagram of a terminal device according to an embodiment of the present disclosure. FIG. 3 is a block diagram of an automatic interpretation server 100 according to an embodiment of the present disclosure.

The automatic interpretation system 1 according to an embodiment of the present disclosure includes the automatic interpretation server 100 (hereinafter referred to as the "server"), a first terminal device 200 of a first user, a second terminal device 300 of a second user, and a database 400.

FIG. 1 illustrates only the first and second terminal devices 200 and 300, but the present disclosure is not essentially limited thereto. The number of terminal devices is not limited. That is, a plurality of terminal devices may be connected to the server 100, and an automatic interpretation service may be performed.

The first user and the second user are users who have an automatic interpretation-based conversation with each other. The first user is a user who can use a first language, and the second user is a user who can use a second language different from the first language.

In the following description, it is assumed and described that the first user utters a voice in the first language through the first terminal device 200 and the second user receives automatic interpretation results of the first language translated into the second language through the second terminal device 300.

In this case, the roles of the first user and the second user are not essentially fixed, and the utterance of the voice and the reception of the automatic interpretation results may be performed in each of the terminal devices as conversations are exchanged.

Forms of the first and second terminal devices 200 and 300 are not specially limited, but it is preferred that the first and second terminal devices 200 and 300 are constructed as wearable devices. That is, each of the first and second terminal devices 200 and 300 may be constructed as a single wearable device or the first and second terminal devices (e.g., smartphones or tablets) and the wearable device may be implemented in a form in which they are connected in a wired way or wirelessly.

Referring to FIG. 2, the first and second terminal devices 200 and 300 may be constructed to include voice collection units 210 and 310, communication units 220 and 320, and voice output units 230 and 330, respectively.

The voice collection unit 210, 310 is a configuration for collecting voices of users, and may be an apparatus having a high-performance microphone function. The voice collection unit 210, 310 converts a voice of a user into a voice signal and transmits the voice to the communication unit 220, 320.

The communication unit 220, 320 delivers, to the server 100, the voice signal of the user received from the voice collection unit 210, 310. The server 100 that has received the voice signal generates automatic interpretation results based on the voice signal. The communication unit 220, 320 provides a function that enables the terminal device to be connected to the server 100 or another terminal device.

The voice output unit 230, 330 receives the automatic interpretation results through the communication unit 220, 320 and delivers the automatic interpretation results to the user. The voice output unit 230, 330 is a device including a speaker, and may be implemented as an earphone or a headset, for example.

Referring to FIG. 3, the automatic interpretation server 100 according to an embodiment of the present disclosure includes a communication module 110, a memory 120, and a processor 130.

The communication module 110 is connected to the plurality of terminal devices 200 and 300 disposed in a designated automatic interpretation zone, and communicates with the terminal devices 200 and 300. That is, the communication module 110 receives a voice signal or transmits automatic interpretation results through the communication unit of each of the terminal devices 200 and 300.

The memory 120 registers and stores voice signals and speaker information including use languages of users, which are received from the plurality of terminal devices 200 and 300. A program for providing an automatic interpretation function has been stored in the memory 120.

When receiving a voice signal of a terminal device within the automatic interpretation zone as the program stored in the memory 120 is executed, the processor 130 matches a plurality of users within a speech-receivable distance of the terminal devices 200 and 300 based on the voice signal and speaker information. Furthermore, the processor 130 performs automatic interpretation on the voice signal, and transmits the results of the automatic interpretation to the terminal devices 200 and 300 corresponding to the results of the matching through the communication module 110.

The server 100 needs to perform a process registering, with the database 400, information of the terminal devices 200 and 300 and users of the respective terminal devices 200 and 300. The server 100 registers, with the database 400, speaker embedding-based speaker information on which a speaker feature of a user can be identified through the terminal device 200, 300 or a separate website. In this case, the server 100 registers, with the database 400, speaker information including a voice signal and use language of the user.

The registered speaker information is used for personal voice activity detection, speaker verification, and speaker identification processes in a subsequent automatic interpretation process. Furthermore, additional information, such as a use language, may be used to connect a counterpart for automatic interpretation.

Hereinafter, a method performed by the automatic interpretation server 100 according to an embodiment of the present disclosure is more specifically described with reference to FIGS. 4 to 7.

Figure 4:
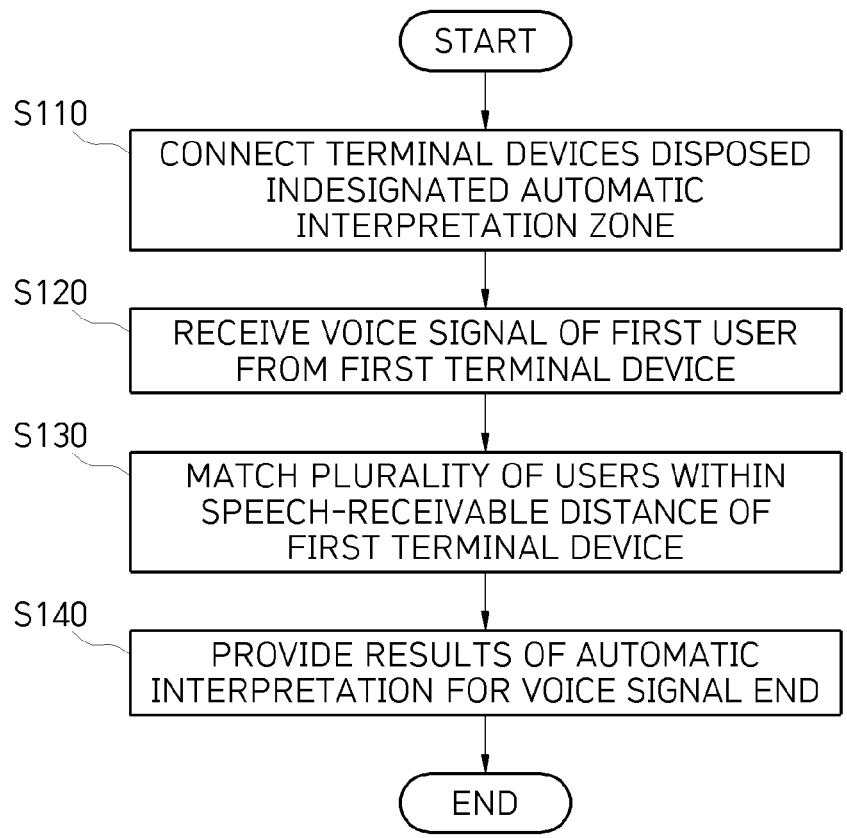
FIG. 4 is a flowchart of an automatic interpretation method according to an embodiment of the present disclosure.
Figure 6B:
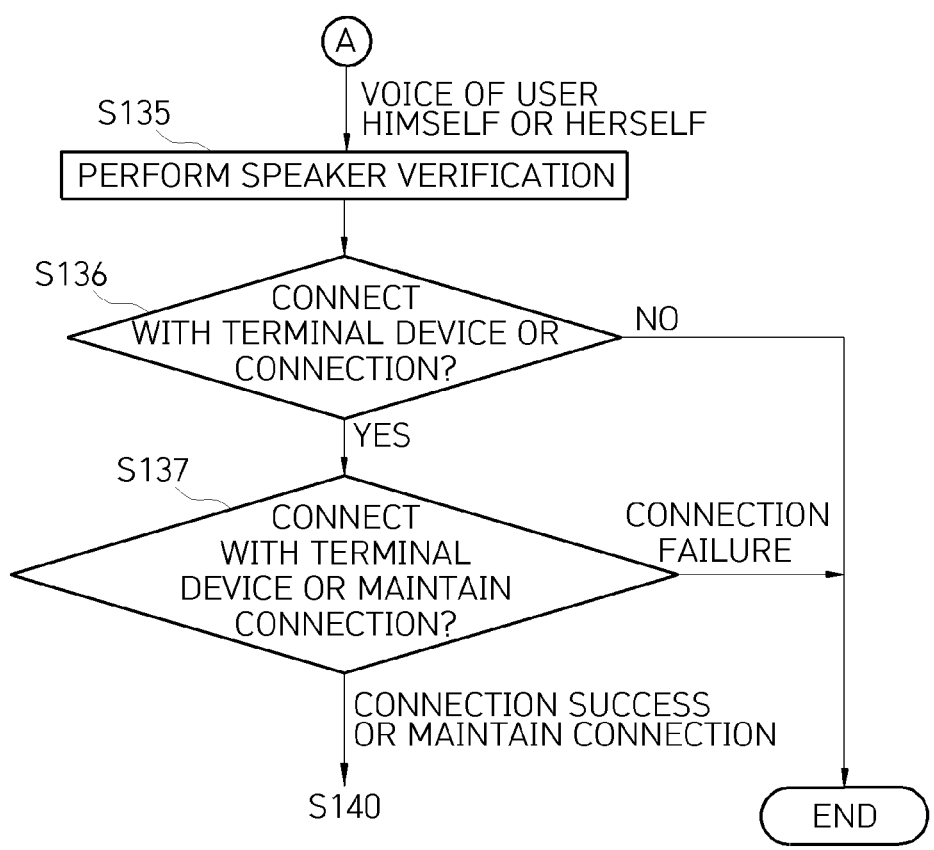

FIG. 4 is a flowchart of an automatic interpretation method according to an embodiment of the present disclosure. FIG. 5 is a diagram for describing a process of connecting terminal devices in an automatic interpretation zone. FIGS. 6A and 6B are flowchart for describing a process of matching users in an embodiment of the present disclosure.

First, the server 100 connects terminal devices disposed in a designated automatic interpretation zone (S110).

Referring to FIG. 5, the server 100 activates the designated automatic interpretation zone (S111), and receives the results of recognition of the terminal device 200, 300 within the activated automatic interpretation zone (S112). Thereafter, the server 100 performs a connection with the terminal device 200, 300 that has recognized the automatic interpretation zone (S113).

More specifically, when the terminal device 200, 300 of a user enters the automatic interpretation zone or the automatic interpretation zone is activated and the terminal device 200, 300 recognizes the automatic interpretation zone, the server 10 and the terminal device 200, 300 may be interconnected.

The server 100 enables the terminal devices 200 and 300, that is, interpretation target users, to be connected based on their use language information included in their speaker information. The use language information is information indicative of the type of language used by each user. Use language information of a first user of the first terminal device 200 may be used as information for identifying a language that is used by a second user of the second terminal device 300, that is, a counterpart. The server 100 may determine whether the first terminal device 200 of the first user and the second terminal device 300 of the second user are connected based on the use language information.

Furthermore, the server 100 may provide a user with information on which user has been connected or a connection with a user has failed in a connection process. In this case, the server 100 may provide a list of users currently connected through the respective terminal devices 200 and 300 or respective user terminals or a list of users with which connections have failed.

Each user who has checked the list may request, from the server 100, a connection with another user not connected through the terminal device 200, 300 or may request the release of a connection with another user with which a connection has been established.

In an embodiment of the present disclosure, the automatic interpretation zone means a zone in which as the terminal devices 200 and 300 are disposed in the automatic interpretation zone, an automatic connection between the terminal devices 200 and 300 capable of interpretation can be established and automatic interpretation results for voice signals between matched terminal devices can be provided.

That is, an automatic interpretation service is provided inside the automatic interpretation zone. The automatic interpretation service is not provided outside the automatic interpretation zone because connections between the terminal devices 200 and 300 and the server 100 are limited.

As an embodiment of the automatic interpretation zone, a zone designated as specific coverage, for example, a zone in which specific Wi-Fi is used may be designated as the automatic interpretation zone. As another embodiment, a user may activate the automatic interpretation zone by using a mobile hotspot. As still another embodiment, the automatic interpretation zone may be activated through another communication means, such as Bluetooth low energy (BLE). In some cases, a specific server address may be manually activated by using a QR code, a smartphone message, etc. so that users are disposed within the same automatic interpretation zone.

According to an embodiment, when connected to the terminal devices 200 and 300 within the automatic interpretation zone corresponding to a specific location, the server 100 may measure signal intensities (RSSI) with Wi-Fi or mobile hotspots of the terminal devices 200 and 300 or communication means of the terminal devices 200 and 300, such as BLE. Furthermore, the server 100 may map the automatic interpretation zone by matching signal intensities on the basis of a specific location and coordinates. The server 100 may provide each of the terminal devices 200 and 300 with map information corresponding to the generated automatic interpretation zone. Each of users who have receive the map information through the terminal device 200, 300 may clearly check the automatic interpretation according to the map information.

Alternatively, the server 100 matches the signal intensities of the terminal devices 200 and 300 on the basis of a specific location and coordinates, and then averages the signal intensities on the basis of the coordinates.

Furthermore, the server 100 may compare, with a preset critical value, the signal intensity averaged for each coordinates, and may generate coordinates greater than the preset critical value as the automatic interpretation zone by collecting the coordinates greater than the preset critical value. Furthermore, the automatic interpretation zone may be mapped and provided to each of the terminal devices 200 and 300.

Next, when receiving a voice signal of the first user from the first terminal device 200 among the terminal devices 200 and 300 connected within the automatic interpretation zone (S120), the server 100 matches a plurality of users within a speech-receivable distance of the first terminal device (S130).

Figure 7:
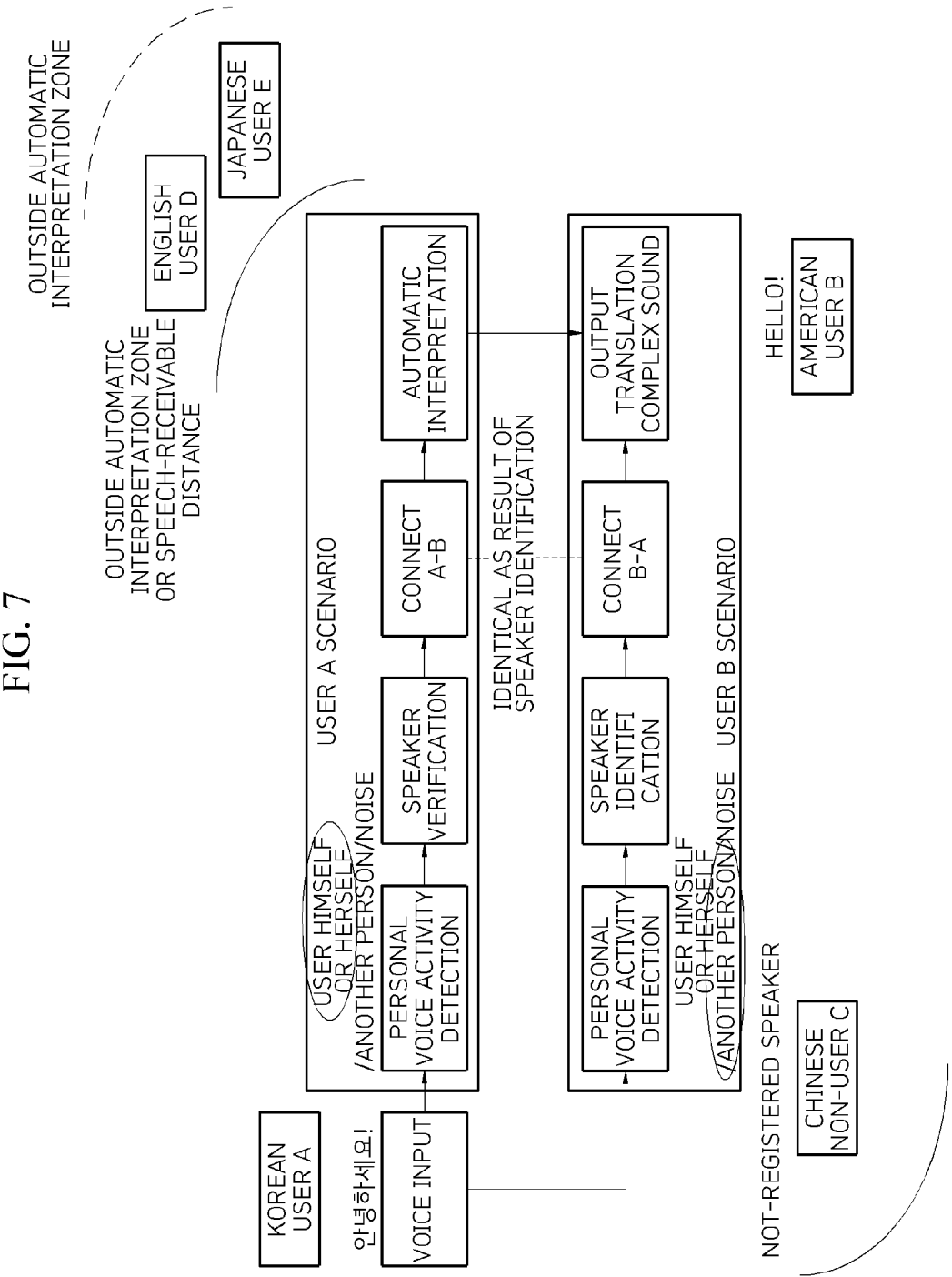
FIG. 7 is an exemplary diagram for describing a process of matching users in an embodiment of the present disclosure.

FIGS. 6A and 6B are flowchart for describing a process of matching users in an embodiment of the present disclosure. FIG. 7 is an exemplary diagram for describing a process of matching users in an embodiment of the present disclosure.

As an embodiment, the server 100 determines whether a voice signal of a first user input through the first terminal device 200 is the voice signal of the first user himself or herself (S131). The server 100 confirms whether an input voice is a voice of the first user himself or herself by using the personal voice activity detection technology with respect to the voice signal of the first user.

Such a personal voice activity detection process is a process of detecting a voice section in which an actual voice is present in the voice signal of the first user, and is a process of detecting a start point and end point of the actual voice.

If the input voice is not the voice of the first user himself or herself and is determined as noise as a result of the determination, the server 100 terminates the automatic interpretation process. Furthermore, if the input voice is not the voice of the first user himself or herself and is determined as a voice of another person (a second user) as a result of the determination, the server 100 performs a speaker identification process for the second user on the basis of the first terminal device 200.

If the input voice is the voice of the first user himself or herself as a result of the determination, the server 100 performs speaker verification on the basis of the first terminal device 200, based on the voice signal and speaker information of the first user (S132).

In the speaker verification process, the server 100 verifies that a speaker of the corresponding voice is the first user based on speaker embedding-based speaker information stored in the database 400. In this case, if the speaker is verified as another person (the second user) not the first user (S133—N) as a result of the speaker verification, the server 100 classifies the corresponding voice as another person and performs a speaker identification process described later.

When failing in the speaker verification, the server 100 may immediately terminate the operation according to a scenario policy.

In contrast, if the speaker is verified as the first user (S133—Y) as a result of the speaker verification, the server 100 confirms whether the first terminal device 200 is in a connectable condition, terminates the process when a state of the first terminal device 200 is the state in which the first terminal device 200 cannot be connected, and attempts a connection with the first terminal device 200 when a state of the first terminal device 200 is the state in which the first terminal device 200 can be connected. Furthermore, the server 100 maintains a connection with the first terminal device 200 if the first terminal device 200 has already been connected thereto (S134).

Next, the server 100 performs automatic interpretation on the voice signal of the first user, transmits the results of the automatic interpretation, that is, a complex sound translated from the voice signal, to the second terminal device 300 of at least one second user corresponding to the results of the matching, and outputs the results of voice recognition to the first user terminal (S140).

If the voice signal of the first user is input to the second terminal device 300, the server 100 receives the corresponding voice signal through the second terminal device 300. In this case, before performing speaker identification, the server 100 determines whether the voice signal of the first user input through the second terminal device 300 is a voice signal corresponding to a person different from the second user (S131).

Furthermore, if the voice signal input to the second terminal device 300 is determined as a voice signal of another person (i.e., the first user) not a voice signal of the second user himself or herself, the server 100 performs speaker identification on the basis of the second terminal device 300, based on the voice signal and speaker information of the first user (S135). Furthermore, when similarity between the voice signal and the speaker embedding-based speaker information of the first user is equal to or higher than a preset critical value as a result of the execution of the speaker identification, the server 100 identifies a speaker of the voice signal of the first user as the first user (S136).

Thereafter, the server 100 confirms whether the second terminal device 300 is in a connectable condition, terminates the process when a state of the second terminal device 300 is the state in which the second terminal device 300 cannot be connected, and attempts a connection with the second terminal device 300 when a state of the second terminal device 300 is the state in which the second terminal device 300 can be connected. Furthermore, the server 100 maintains a connection with the second terminal device 300 if the in second terminal device 300 has already been connected thereto (S137).

The server 100 matches the first and second users corresponding to the first and second terminal devices 200 and 300 on which the speaker verification and the speaker identification have been completed as described above.

Next, the server 100 performs automatic interpretation on the voice signal, and transmits the results of the automatic interpretation, that is, a complex sound translated from the voice signal, to the second terminal device 300 of at least one second user corresponding to the results of the matching (S140).

Referring to FIG. 7, a user A who has finished a registration process with respect to the server 100 is automatically connected to other users B, D, and E within an automatic interpretation zone.

In this case, assuming that the users A and B become one conversation pair and the users D and E located far away from the user A become another conversation pair, the users A and B and the users D and E are connected to the server 100, and terminal devices corresponding to the conversation pair are connected.

However, voices of the users A and B are not delivered to terminal devices of the users D and E because the users A and B are placed outside a speech-receivable distance of the terminal devices of the users D and E. Likewise, voices of the users D and E are also not delivered to terminal devices of the users A and B. Accordingly, the voices of the users A and B and the voices of the users D and E are separated from each other and operated in automatic interpretation processes. In the example of FIG. 7, the user A is described as a first user, and the user B is described as a second user.

If the conversation pair of the users D and E is placed near the users A and B, the voices of the users D and E are input to the terminal devices of the users A and B, and the voices of the users A and B are input to the terminal devices of the users D and E, the voices of the users A and B and D and E may also be recognized as targets for automatic interpretation and may be delivered to different conversation pairs because the voices of the users are within a distance in which the voices can be heard even in a situation between actual native language users.

In this case, if a user of a corresponding terminal device does not want to receive the results of automatic interpretation for a voice of a specific user due to low relevance when the voice of the specific user is received or a connection with the specific user is detected, the user may exclude the specific user from a target for automatic interpretation by performing an operation of disconnecting a connection with the specific user.

In the state in which the user A and the user B have been connected as described above, when the user A (e.g., a first user) who is a Korean speaks "안녕하세요", the speech is transmitted to the server 100 in real time through the terminal device of the user A.

Thereafter, the server 100 detects whether the speech is a voice of the user A himself or herself on the basis of the first terminal device 200 by performing personal voice activity detection on the voice signal of the user A, performs speaker verification on the detected voice, confirms that the user A is the speaker, and then waits for a connection with the terminal device of the user A.

Furthermore, in a scenario for the user B (e.g., a second user) who is an American, the server 100 confirms that the voice of the user A is a voice of the user A, that is, a different person not a voice of the user B himself or herself, by attempting personal voice activity detection on the voice of the user A, and identifies that the user A is the speaker based on speaker information registered with the database 400 in order to confirm whose voice is the corresponding voice.

The terminal devices of the user A and the user B on which the speaker verification and the speaker identification have been completed as described above are connected. If the terminal devices of the user A and the user B have already been connected, the server 100 maintains the connection. Thereafter, the server 100 transmits, to the terminal device of the user B, a complex sound translated from the voice of the user A after the voice is automatically interpreted. Accordingly, the user B is provided with the results of the automatic interpretation called "Hello" in the form of a voice.

In an embodiment of the present disclosure, if a voice signal of a third user whose speaker information has not been registered with the database 400 is input to the first and second terminal devices 200 and 300, the server 100 determines whether the voice signal of the third user is a voice signal corresponding to a person different from the first and second users of the first and second terminal devices 200 and 300 on the basis of the first and second terminal devices 200 and 300 through a personal voice activity detection process.

Thereafter, the server 100 performs speaker identification on the basis of the first and second terminal devices 200 and 300 by comparing, with speaker information of the first and second users, the voice signal of the third user determined as another person. Furthermore, since the third user is a user registered with the database 400 as a result of the speaker identification, the server 100 does not permit the matching of the third user with the first and second users.

An exception case in an embodiment of the present disclosure is described through the example of FIG. 7.

If a non-user C who is a Chinese and whose terminal device is not connected to the automatic interpretation server 100 is placed within the speech-receivable distance of the users A and B and a voice of the non-user C is input to each of the terminal devices of the users A and B, the server 100 detects the non-user C as a different person on the basis of the terminal devices of the users A and B in a personal voice activity detection process, and then determines to not perform automatic interpretation on the voice of the non-user C based on speaker information in a speaker identification process.

In this case, in the speaker identification process, the voice of the non-user C is compared with speaker embedding-based speaker information of each of the users A and B. When similarity between the voice signal of the non-user C and the speaker embedding-based speaker information of each of the users A and B is less than a preset critical value as a result of the comparison, the server 100 may immediately stop the automatic interpretation.

As another exception case, in a speaker identification process, if a third user whose voice signal based on speaker information has similarity equal to or higher than a preset critical value is present, the server 100 determines whether the third user is placed within the speech-receivable distance of the first and second terminal devices 200 and 300. Furthermore, if the third user is placed outside the speech-receivable distance as a result of the determination, the server 100 does not permit the matching of the third user with the first and second users.

If a third voice is input to the first and second terminal devices 200 and 300, the server 100 detects a corresponding user as a different person through a personal voice activity detection process and performs a speaker identification process.

As a result of the execution of such a speaker identification process, if a policy that selects one user whose similarity is equal to or higher than a critical value or who has been registered with unconditional speaker information is designated, a third user not related to a conversation counterpart may be designated as a speaker.

In order to solve such a problem, the server 100 determines that a terminal device of the third user is placed outside the speech-receivable distance of the first and second terminal devices 200 and 300 on the basis the first and second terminal devices 200 and 300, and does not permit the matching of the third user with the first and second users.

Contrariwise, if the terminal device of the third user is placed inside the speech-receivable distance, the server 100 matches the first to third users and provides automatic interpretation results for voices of the first to third users.

In the aforementioned description, steps S110 to S140 may be further divided into additional steps or combined as smaller steps depending on an implementation example of the present disclosure. Furthermore, some steps may be omitted if necessary, and the sequence of steps may be changed. Furthermore, although other contents are omitted, the contents of FIGS. 1 to 3 may also be applied to the methods of FIGS. 4 to 7.

The aforementioned embodiment of the present disclosure may be implemented as a program (or application) and stored in a medium in order to be executed by being combined with a computer, that is, hardware.

The aforementioned program may include a code coded in a computer language, such as C, C++, JAVA, Ruby, Python, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method performed by an automatic interpretation server based on a zero user interface (UI), which communicates with a plurality of terminal devices having a microphone function, a speaker function, a communication function, and a wearable function, the method comprising:
   connecting terminal devices disposed within a designated automatic interpretation zone;
   receiving a voice signal of a first user from a first terminal device among the terminal devices within the automatic interpretation zone;
   matching a plurality of users placed within a speech-receivable distance of the first terminal device;
   performing automatic interpretation on the voice signal and transmitting results of the automatic interpretation to a second terminal device of at least one second user corresponding to a result of the matching; and
   registering voice signals and speaker information comprising use languages of users from the plurality of terminal devices,
   wherein the matching of the plurality of users placed within the speech-receivable distance of the first terminal device comprises:
   when a third user whose similarity between the speaker information and information in a voice signal is equal to or higher than a preset critical value is present,
   determining whether the third user is placed within the speech-receivable distance; and
   not permitting matching of the third user with the first and second users when the third user is placed outside the speech-receivable distance as a result of the determination.

2. The automatic interpretation method of claim 1, wherein the connecting of the terminal devices disposed within the designated automatic interpretation zone comprises:
   activating the designated automatic interpretation zone;
   receiving results of recognition of a terminal device within the activated automatic interpretation zone; and
   performing a connection with the terminal device recognizing the automatic interpretation zone.

3. The automatic interpretation method of claim 1, wherein the matching of the plurality of users placed within the speech-receivable distance of the first terminal device comprises:
   performing speaker verification on a basis of the first terminal device based on the voice signal and speaker information of the first user;
   performing speaker identification on a basis of the second terminal device based on the voice signal and the speaker information of the first user; and
   matching the first user and the second user on which the speaker verification and the speaker identification have been completed and who correspond to the first and second terminal devices.

4. The automatic interpretation method of claim 1, wherein the matching of the plurality of users placed within the speech-receivable distance of the first terminal device further comprises determining whether the voice signal of the first user received through the first terminal device is a voice signal of the first user himself or herself, before performing speaker verification.

5. The automatic interpretation method of claim 1, wherein the matching of the plurality of users placed within the speech-receivable distance of the first terminal device further comprises determining whether the voice signal of the first user received through the second terminal device is a voice signal corresponding to a person different from the second user, before performing the speaker identification.

6. The automatic interpretation method of claim 1, wherein the matching of the plurality of users placed within the speech-receivable distance of the first terminal device further comprises:
   when a voice signal of a third user whose speaker information has not been registered is input to the first and second terminal devices, determining whether the voice signal of the third user is a voice signal corresponding to a person different from the first and second users on a basis of the first and second terminal devices;

performing speaker identification on a basis of the first and second terminal devices based on the voice signal and the speaker information of the third user; and not permitting matching with the not-registered third user based on a result of the speaker identification.

7. An automatic interpretation server based on a zero user interface (UI), comprising:

a communication module connected to a plurality of terminal devices disposed within a designated automatic interpretation zone and configured to communicate with the plurality of terminal devices;

a memory which registers and stores voice signals and speaker information comprising use languages of users from the plurality of terminal devices and in which a program for providing an automatic interpretation function has been stored; and a processor configured to, when receiving a voice signal of a terminal device within the automatic interpretation zone as the program stored in the memory is executed, match a plurality of users within a speech-receivable distance of the terminal device based on the voice signal and speaker information, perform automatic interpretation on the voice signal, and transmit results of the automatic interpretation to a terminal device corresponding to a result of the matching through the communication module, wherein the processor, when a third user whose similarity between the speaker information and information in a voice signal is equal to or higher than a preset critical value is present, determines whether the third user is placed within the speech-receivable distance, and does not permit matching of the third user with a first user and a second user when the third user is placed outside the speech-receivable distance as a result of the determination.

8. The automatic interpretation server of claim 7, wherein the processor performs speaker verification on a basis of a first terminal device corresponding to the first user based on a voice signal and speaker information of the first user, performs speaker identification on a basis of a second terminal device based on the voice signal and speaker information of the first user, and matching-matches users on which the speaker verification and the speaker identification have been completed and who correspond to the first and second terminal devices.

9. The automatic interpretation server of claim 8, wherein the processor determines whether the voice signal of the first user received through the first terminal device is a voice signal of the first user himself or herself, before performing the speaker verification.

10. The automatic interpretation server of claim 8, wherein the processor determines whether the voice signal of the first user received through the second terminal device is a voice signal corresponding to a person different from the second user, before performing the speaker identification.

11. The automatic interpretation server of claim 8, wherein the processor when a voice signal of a third user, whose speaker information has not been registered is input to the first and second terminal devices, determines whether the voice signal of the third user is a voice signal corresponding to a person different from the first and second users on a basis of the first and second terminal devices, performs speaker identification on a basis of the first and second terminal devices based on the voice signal and speaker information of the third user, and does not permit matching with the not-registered third user based on a result of the speaker identification.

12. The automatic interpretation server of claim 7, wherein the processor activates the designated automatic interpretation zone, and performs a connection with a terminal device that has recognized the automatic interpretation zone, when receiving results of recognition of the terminal device for the activated automatic interpretation zone through the communication module.

* * * * *